United States Patent
Kim et al.

(10) Patent No.: US 8,848,818 B2
(45) Date of Patent: Sep. 30, 2014

(54) APPARATUS AND METHOD FOR GENERATING CODEBOOK IN WIRELESS COMMUNICATION SYSTEM

(75) Inventors: Hyung Tae Kim, Anyang-si (KR); Dae Won Lee, Anyang-si (KR); Han Byul Seo, Anyang-si (KR); Byoung Hoon Kim, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 389 days.

(21) Appl. No.: 13/388,662

(22) PCT Filed: Aug. 19, 2010

(86) PCT No.: PCT/KR2010/005486
§ 371 (c)(1),
(2), (4) Date: Feb. 2, 2012

(87) PCT Pub. No.: WO2011/021861
PCT Pub. Date: Feb. 24, 2011

(65) Prior Publication Data
US 2012/0136912 A1    May 31, 2012

Related U.S. Application Data

(60) Provisional application No. 61/333,269, filed on May 11, 2010, provisional application No. 61/330,399, filed on May 3, 2010, provisional application No. 61/236,160, filed on Aug. 24, 2009, provisional application No. 61/235,014, filed on Aug. 19, 2009.

(51) Int. Cl.
*H04B 7/02* (2006.01)
*H04B 7/06* (2006.01)
*H04B 7/04* (2006.01)

(52) U.S. Cl.
CPC .............. *H04B 7/024* (2013.01); *H04B 7/0639* (2013.01); *H04B 7/0417* (2013.01); *H04B 7/0452* (2013.01)

USPC .......... 375/267; 375/260; 375/262; 375/295; 375/316; 375/340

(58) Field of Classification Search
CPC .. H04B 7/0456; H04B 7/0639; H04B 7/0452; H04B 7/0626; H04B 7/0417; H04B 7/0465; H04B 7/0469; H04B 7/0473; H04B 7/0617; H04B 7/0697; H04B 7/0413; H04B 7/061; H04B 7/0632; H04B 7/0634; H04L 25/0204; H04L 5/0023; H04L 1/0643; H04L 2025/03426; H04L 25/03942; H04L 1/005; H04L 1/0054; H04L 25/0242; H04L 1/20; H04L 25/0222; H04L 25/03343; H04L 25/067; H04L 5/0048; H04L 1/0009
USPC ......... 375/260, 262, 265, 267, 270, 271, 289, 375/295, 299, 316, 320, 332, 340–344, 348
See application file for complete search history.

(56) References Cited

U.S. PATENT DOCUMENTS

| | | | |
|---|---|---|---|
| 7,649,955 B2 * | 1/2010 | Lin et al. ......................... | 375/267 |
| 8,254,486 B2 * | 8/2012 | Shi et al. ......................... | 375/267 |
| 8,532,042 B2 * | 9/2013 | Clerckx et al. ................. | 370/329 |
| 8,787,183 B2 * | 7/2014 | Mallik et al. ................... | 370/252 |
| 2007/0280386 A1 * | 12/2007 | Waes et al. ...................... | 375/347 |
| 2008/0232501 A1 * | 9/2008 | Khojastepour et al. ........ | 375/267 |
| 2008/0273612 A1 | 11/2008 | Khojastepour et al. | |
| 2009/0047999 A1 | 2/2009 | Xia et al. | |
| 2009/0086842 A1 * | 4/2009 | Shi et al. ......................... | 375/267 |
| 2009/0203335 A1 * | 8/2009 | Lee et al. ........................ | 455/103 |
| 2009/0238303 A1 * | 9/2009 | Mondal et al. ................. | 375/295 |
| 2009/0323849 A1 * | 12/2009 | Bala et al. ....................... | 375/267 |
| 2010/0054212 A1 * | 3/2010 | Tang .............................. | 370/335 |
| 2011/0064158 A1 * | 3/2011 | Li et al. .......................... | 375/267 |
| 2011/0080964 A1 * | 4/2011 | Shamsi et al. ................. | 375/260 |
| 2013/0003808 A1 * | 1/2013 | Au-Yeung et al. ............ | 375/224 |
| 2013/0064315 A1 * | 3/2013 | Heath et al. .................... | 375/260 |

* cited by examiner

OTHER PUBLICATIONS

Raghavan et al.; Systematic Codebook designs for Quantized Beamforming in Correlated MIMO channels; Sep. 2007; IEEE journal on selected areas in communication; 13 pages.*

*Primary Examiner* — Hirdepal Singh

(74) *Attorney, Agent, or Firm* — Lee, Hong, Degerman, Kang & Waimey (57) ABSTRACT

An apparatus and method for generating a codebook in a wireless communication system are disclosed. The codebook generation method includes determining one or more dominant singular vectors in a channel matrix for antennas and setting each of the dominant singular vectors as a random non-zero vector, generating a first codebook having codewords, a minimum distance between the codewords being maximized, using the random non-zero vector in a region that includes unit norm vectors each having a Euclidean distance to each of the dominant singular vectors, equal to or less than a predetermined value, generating a second codebook corresponding to a unitary matrix that rotates the random non-zero vector toward the dominant singular vectors, and generating a final codebook using the first and second codebooks.

18 Claims, 5 Drawing Sheets

APPARATUS AND METHOD FOR GENERATING CODEBOOK IN WIRELESS COMMUNICATION SYSTEM

CROSS-REFERENCE TO RELATED APPLICATIONS

This application is the National Stage filing under 35 U.S.C. 371 of International Application No. PCT/KR2010/005486, filed on Aug. 19, 2010, which claims the benefit of U.S. Provisional Application Ser. Nos. 61/333,269, filed on May 11, 2010, 61/330,399, filed on May 3, 2010, 61/236,160, filed on Aug. 24, 2009, and 61/235,014, filed on Aug. 19, 2009, the contents of which are all incorporated by reference herein in their entirety.

TECHNICAL FIELD

The present invention relates to an apparatus and method for generating a codebook in a wireless communication system.

BACKGROUND ART

In a cellular Multiple Input Multiple Output (MIMO) communication environment, data rate can be increased by beamforming between a transmitter and a receiver. It is determined based on channel information whether to use beamforming or not. Basically, the receiver quantizes channel information estimated from a reference signal using a codebook and feeds back the quantized channel information to the transmitter.

A brief description will be made of a spatial channel matrix (also referred to simply as a channel matrix) for use in generating a codebook. The channel matrix may be expressed as $$H(i,k) = \begin{bmatrix} h_{1,1}(i,k) & h_{1,2}(i,k) & \cdots & h_{1,Nt}(i,k) \\ h_{2,1}(i,k) & h_{2,2}(i,k) & \cdots & h_{2,Nt}(i,k) \\ \vdots & \vdots & \ddots & \vdots \\ h_{Nr,1}(i,k) & h_{Nr,2}(i,k) & \cdots & h_{Nr,Nt}(i,k) \end{bmatrix}$$

where H(i,k) denotes the channel matrix, $N_r$ denotes the number of Reception (Rx) antennas, $N_t$ denotes the number of Transmission (Tx) antennas, r denotes the index of an Rx antenna, t denotes the index of a Tx antenna, i denotes the index of an Orthogonal Frequency Division Multiplexing (OFDM) or Single Carrier-Frequency Division Multiple Access (SC-FDMA) symbol, and k denotes the index of a subcarrier. Thus $h_{r,t}(i,k)$ is an element of the channel matrix H(i,k), representing the channel state of a $k^{th}$ subcarrier of an $i^{th}$ symbol between a $t^{th}$ Tx antenna and an $r^{th}$ Rx antenna.

A spatial channel covariance matrix R that is applicable to the present invention is expressed as $R=E[H_{i,k}H_{i,k}{}^H]$ where H denotes the channel matrix, E[ ] denotes a mean, i denotes a symbol index, and k denotes a subcarrier index.

Singular Value Decomposition (SVD) is one of significant factorizations of a rectangular matrix, with many applications in signal processing and statistics. SVD is a generalization of the spectral theorem of matrices to arbitrary rectangular matrices. Spectral theorem says that an orthogonal square matrix can be unitarily diagonalized using a base of eigenvalues. Let the channel matrix H be an m×m matrix having real or complex entries. Then the channel matrix H may be expressed as the product of the following three matrices.

$$H_{m \times m} = U_{m \times m} \Sigma_{m \times n} V_{m \times n}{}^H$$

where U and V are unitary matrices and $\Sigma$ is an m×n diagonal matrix with non-negative singular values. For the singular values, $\Sigma = \text{diag}(\sigma_1 \ldots \sigma_r)$, $\sigma_i = \sqrt{\lambda_8}$, the directions of the channels and strengths allocated to the channel directions are known from the SVD of the channels. The channel directions are represented as the left singular matrix U and the right singular matrix V. Among r independent channels created by MIMO, the direction of an $i^{th}$ channel is expressed as $i^{th}$ column vectors of the singular matrices U and V and the channel strength of the $i^{th}$ channel is expressed as $\sigma_i^2$. Because the singular matrices U and V are each composed of mutually orthogonal column vectors, the $i^{th}$ channel can be transmitted without interference with a $j^{th}$ channel. The direction of a dominant channel having a large $\sigma_i^2$ value exhibits a relatively small variance over a long time or across a wide frequency band, whereas the direction of a channel having a small $\sigma_i^2$ value exhibits a large variance.

This factorization into the product of three matrices is called SVD. The SVD is very general in the sense that it can be applied to any matrices whereas EigenValue Decomposition (EVD) can be applied only to orthogonal square matrices. Nevertheless, the two decompositions are related.

If the channel matrix H is a positive, definite Hermitian matrix, all eigenvalues of the channel matrix H are non-negative real numbers. The singular values and singular vectors of the channel matrix H are its eigenvalues and eigenvectors.

The EVD may be expressed as $$HH^H = (U\Sigma V^H)(U\Sigma V^H)^H = U\Sigma \Sigma^T U^H$$

$$H^H H = (U\Sigma V^H)^H (U\Sigma V^H) = V\Sigma^T \Sigma V$$

where the eigenvalues may be $\lambda_1 \ldots \lambda_r$. Information about the singular matrix U representing channel directions is known from the SVD of $HH^H$ and information about the singular matrix V representing channel directions is known from the SVD of $H^H H$. In general, Multi-User MIMO (MU-MIMO) adopts beamforming at a transmitter and a receiver to achieve high data rates. If reception beams and transmission beams are represented as matrices T and W respectively, channels to which beamforming is applied are expressed as THW=TU($\Sigma$) VW. Accordingly, it is preferable to generate reception beams based on the singular matrix U and to generate transmission beams based on the singular matrix V.

A major issue in designing a codebook is accurate channel quantization to reduce feedback overhead using as small a number of bits as possible and achieve a sufficient beamforming gain. One codebook design proposed by or approved as recent communication standards of mobile communication systems, for example, $3^{rd}$ Generation Partnership Project Long Term Evolution (3GPP LTE) and LTE-Advanced (LTE-A), and Institute of Electrical and Electronics Engineers (IEEE) 16 m is to transform a codebook using a long-term covariance matrix of channels, as expressed by [Equation 1].

$$W' = \text{norm}(RW) \qquad [\text{Equation 1}]$$

where w denotes an existing codebook designed to reflect short-term channel information, R denotes the long-term covariance matrix of the channel matrix H, norm(A) denotes a matrix obtained by normalizing each column of a matrix A to 1, and W' is a final codebook obtained by transforming the existing codebook W using the channel matrix H, the long-term covariance matrix R of the channel matrix H, and the norm function.

The long-term covariance matrix R of the channel matrix H may be given as $$R = E[H^H H] = V\Lambda V^H = \sum_{i=1}^{Nt} \sigma_i v_i v_i^H \qquad \text{[Equation 2]}$$

The long-term covariance matrix R of the channel matrix H is decomposed into $V\Lambda V^H$ in SVD. V denotes an $N_t \times N_t$ unitary matrix having $V_i$ as an $i^{th}$ column vector. A denotes a diagonal matrix having $\sigma_i$ as an $i^{th}$ diagonal element and $V^H$ denotes a Hermitian matrix of the matrix V. $\sigma_i$ and $V_i$ are an $i^{th}$ singular value and an $i^{th}$ singular column vector corresponding to the $i^{th}$ singular value ($\sigma_1 \geq \sigma_2 \leq \ldots \geq \sigma_{Nt}$).

DISCLOSURE

Technical Problem

An object of the present invention devised to solve the problem lies on a method for generating a codebook in a wireless communication system.

Another object of the present invention devised to solve the problem lies on an apparatus for generating a codebook in a wireless communication system.

It will be appreciated by persons skilled in the art that the objects that can be achieved with the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for generating a codebook in a wireless communication system, including determining one or more dominant singular vectors in a channel matrix of each antenna, and generating codewords by sampling the codewords in a region that includes unit norm vectors, each norm vector having a Euclidean distance to each of the dominant singular vectors, equal to or less than a predetermined value. The codewords are generated through sampling of the codewords of the region by multiplying a rotation matrix being a diagonal matrix before each of the dominant singular vectors, and a minimum distance between the generated codewords is maximized.

In another aspect of the present invention, provided herein is a method for generating a codebook in a wireless communication system, including determining one or more dominant singular vectors of in the channel matrix of each antenna; determining a random non-zero vector; generating a first codebook corresponding to a unitary matrix that rotates the random non-zero vector toward the one or more dominant singular vectors of a region; generating a second codebook whose codewords are sampled from the region that includes unit norm vectors, each unit vector having Euclidean distance to the random non-zero vector is equal to or less than a predetermined value; and generating a final codebook using the first and second codebooks.

In another aspect of the present invention, provided herein is a method for generating a codebook in a wireless communication system, including determining one or more dominant singular vectors in the channel matrix of each antenna; determining a random non-zero vector; generating a first codebook by quantizing the one or more dominant singular vectors; generating a second codebook by sampling codewords for a region that includes unit norm vectors, each having a Euclidean distance to the random non-zero vector is equal to or less than a predetermined value, so that a minimum distance between the codewords is maximized, and by subtracting the random non-zero vector from the sampled codewords, and generating a final codebook using the first and second codebooks.

In another aspect of the present invention, provided herein is a method for generating a codebook to support multi-cell communication at a base station in a multi-cell environment, including determining a serving cell dominant singular vector using a covariance matrix corresponding to channel measurement information between the base station and a user equipment CUE) within the serving cell of the base station and determining a neighboring cell dominant singular vector using a covariance matrix of an interference channel between the base station and a user equipment within the neighboring cell, determining a modified dominant singular vector spaced from the serving cell dominant singular vector by a first predetermined value or less and spaced from the second dominant singular vector by a second predetermined value or larger, and generating codewords by sampling the codewords for a region that includes unit norm vectors each having a Euclidean distance to the determined third dominant singular vector, equal to or less than a third predetermined value. The codewords are generated through sampling of the codewords in the region by multiplying a rotation matrix being a diagonal matrix before the modified dominant singular vector, and a minimum distance between the codewords is maximized.

In a further aspect of the present invention, provided herein is a method for generating a codebook at a user equipment (UE) in a multi-cell environment, including receiving one or more a dominant singular vectors corresponding to long-term channel information from a base station (BS), and generating codewords corresponding to short-term channel information by sampling the codewords for a region that includes unit norm vectors, each unit norm vector having a Euclidean distance to the received dominant singular vectors, equal to or less than a predetermined value. The codewords are generated through sampling of the codewords in the region by multiplying a rotation matrix being a diagonal matrix before the dominant singular vector, and a minimum distance between the codewords is maximized.

Advantageous Effects

In a multi-cell environment, communication between a User Equipment (UE) and a Base Station (BS) can be efficiently supported by use of a codebook according to the present invention.

Since the codebook is designed so that the minimum distance between codewords included in the codebook is maximized and codewords are densely populated around a dominant singular vector, the communication performance of the UE and the BS using the codebook can be greatly increased.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a $3^{rd}$ Generation Partnership Project Long Term Evolution (3GPP LTE) mobile communication system is being used. However, the description is applicable to any other mobile communication system except for specific features inherent to the 3GPP LTE system.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a User Equipment (UE) is assumed to refer to a mobile or fixed user end device such as a Mobile Station (MS), an Advanced Mobile Station (AMS), etc. and the term 'Base Station (BS)' is assumed to refer to any node of a network end, such as a Node B, an enhanced Node B (eNB or eNode B), an Access Point (AP), etc., communicating with a UE.

In a mobile communication system, a UE may receive information from a BS on a downlink and transmit information to the BS on an uplink. The information that the UE transmits or receives includes data and various types of control information. There are many physical channels according to the types and usages of information that the UE transmits or receives.

3GPP LTE and LTE-Advanced (LTE-A) systems, as exemplary mobile communication systems to which the present invention is applicable, will be described below.

Figure 1:
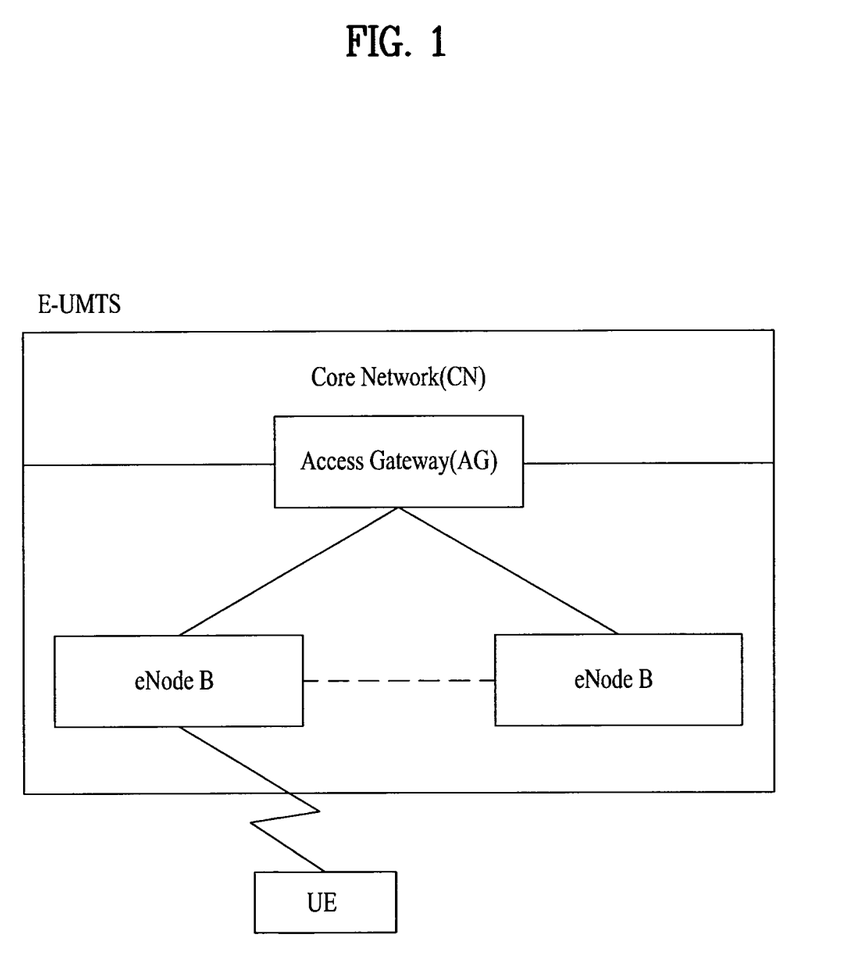
FIG. 1 illustrates the configuration of an Evolved-Universal Mobile Telecommunications System (E-UMTS) network as an example of a mobile communication system.

FIG. 1 illustrates the configuration of an Evolved Universal Mobile Telecommunications System (E-UMTS) network as an example of a mobile communication system. E-UMTS is an advanced version of the legacy Universal Mobile Telecommunications System (UMTS). The 3GPP working group is working on basic standardization of E-UMTS. E-UMTS is also called LTE. For detailed information as to the technical specifications of UMTS and E-UMTS reference can be made to Release 7 and Release 8 of "$3^{rd}$ Generation Partnership Project; Technical Specification Group Radio Access Network", respectively.

Referring to FIG. 1, the E-UMTS system includes a UE, eNode Bs, and an Access Gateway (AG) at an end of an E-UMTS Terrestrial Radio Access Network (E-UTAN), connected to an external network. An eNode B may simultaneously transmit multiple data streams to provide a broadcast service, a multicast service, and/or a unicast service.

One eNode B covers one or more cells. A cell provides UEs with downlink or uplink transmission services in an allocated bandwidth of 1.25, 2.5, 5, 10, 15 or 20 MHz. Different cells may operate in different bandwidths. An eNode B controls data transmission and reception of a plurality of UEs. The eNode B transmits downlink scheduling information for downlink data to a UE, thus notifying the UE of a time-frequency area, a coding scheme, a data size, and Hybrid Automatic Repeat reQuest (HARQ) information of the downlink data.

In addition, the eNode B transmits information about a time-frequency area, a coding scheme, a data size, and HARQ information for uplink data transmission of the UE by uplink scheduling information. An interface for transmitting user traffic or control traffic may be established between eNode Bs. A Core Network (CN) may include an AG and a network node for user registration of UEs. The AG manages the mobility of UEs on a Tracking Area (TA) basis. A TA includes a plurality of cells.

The development of wireless communication technology has reached LTE based on Wideband Code Division Multiple Access (WCDMA). Nevertheless, demands and expectations of users and service providers are continuously increasing. As other radio access technologies are under development, new technological advances, such as reduction of cost per bit, increase of service availability, flexible use of frequency bands, structure simplification and open interfaces, and appropriate power consumption of UEs, are required in order to maintain competitiveness.

The 3GPP has recently been working on standardization of a successor technology to LTE. This technology is referred to as "LTE-Advanced" or "LTE-A" in the present invention. One significant difference between the LTE system and the LTE-A system lies in system bandwidth. The LTE-A system seeks to support a broad band of up to 100 MHz. To achieve this goal, the LTE-A system adopts a technique of realizing a broad band by use of a plurality of frequency blocks, namely carrier aggregation or bandwidth aggregation. To use a wider frequency band than can be achieved by carrier aggregation, a plurality of frequency blocks are used as a single broad logical frequency band. The bandwidth of each frequency block may be defined based on the bandwidth of a system block used in the LTE system. Each frequency block is transmitted on a component carrier.

Figure 2:
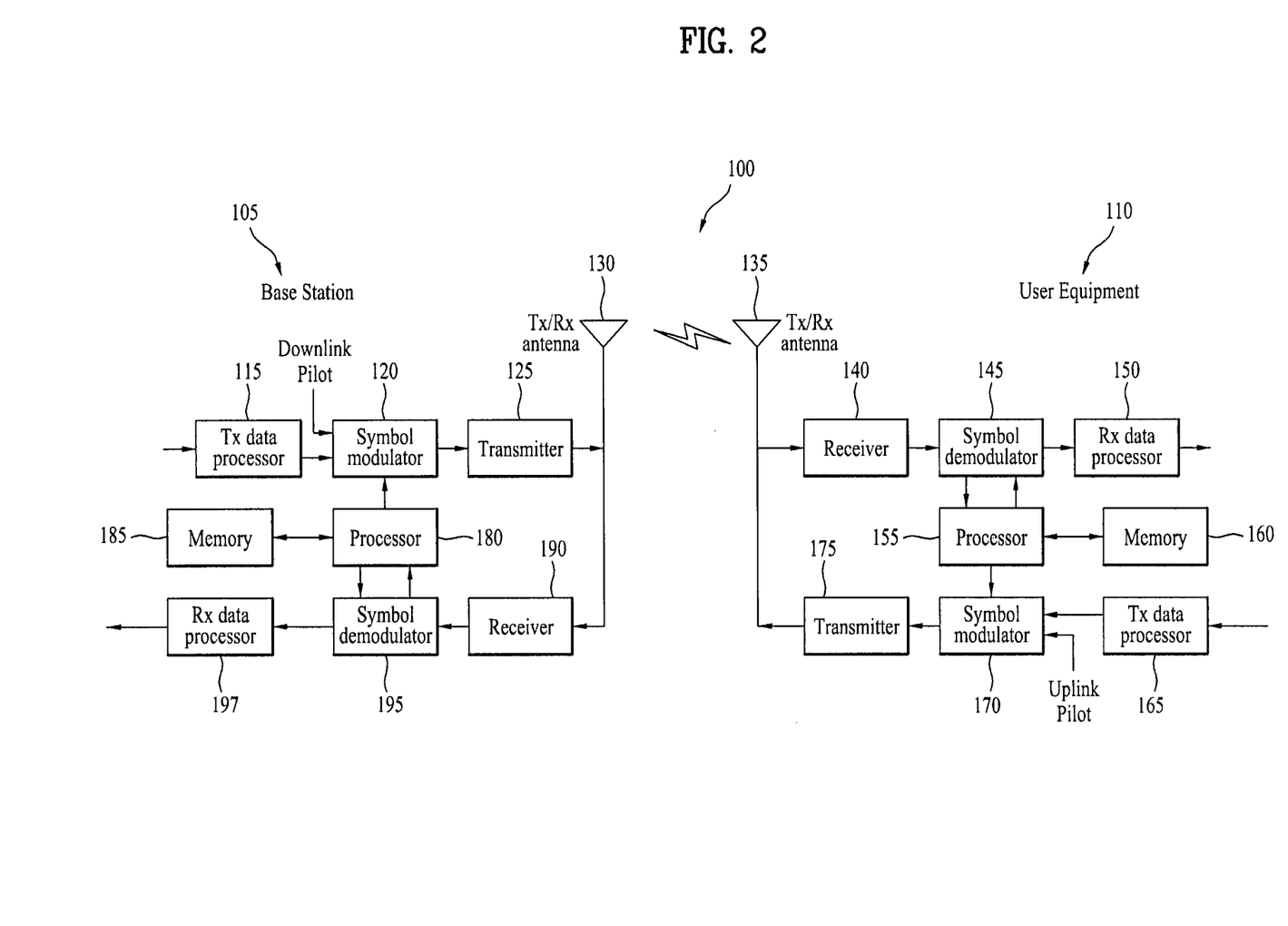
FIG. 2 is a block diagram of a Base Station (BS) and a User Equipment (UE) in a wireless communication system according to an exemplary embodiment of the present invention.

FIG. 2 is a block diagram of a BS and a UE in a wireless communication system according to the present invention.

While one BS 105 and one UE 110 are shown in FIG. 2 to simplify a wireless communication system 100, the wireless communication system 100 may obviously include a plurality of BSs and/or a plurality of UEs.

Referring to FIG. 2, the BS 105 may include a Tx data processor 115, a symbol modulator 120, a transmitter 125, a Tx/Rx antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. While the antennas 130 and 135 are each shown as a single antenna in the BS 105 and the UE 110, the BS 105 and the UE 110 may each have a plurality of antennas. Hence, the BS 105 and the UE 110 support MIMO, specifically both Single User-MIMO (SU-MIMO) and MU-MIMO in the present invention.

On the downlink, the Tx data processor 115 receives traffic data, processes the received traffic data through formatting, coding, interleaving, and modulation (i.e. symbol mapping), and thus outputs modulated symbols (or data symbols). The symbol modulator 120 processes the data symbols received from the Tx data processor 115 and pilot symbols, thus producing a symbol stream.

More specifically, the symbol modulator 120 multiplexes the data symbols and the pilot symbols and transmits the multiplexed symbols to the transmitter 125. Each transmission symbol may be a data symbol, a pilot symbol or a zero value. Pilot symbols may be transmitted successively during each symbol period. The pilot symbols may be Frequency Division Multiplexing (FDM) symbols, OFDM symbols, Time Division Multiplexing (TDM) symbols, or Code Division Multiplexing (CDM) symbols.

The transmitter 125 converts the symbol stream into one or more analog signals and generates a downlink signal suitable for transmission on a radio channel by additionally processing the analog signals (e.g. amplification, filtering, and frequency upconversion). The downlink signal is transmitted to the UE 110 through the antenna 130.

The UE 110 receives the downlink signal from the BS 105 and provides the received downlink signal to the receiver 140. The receiver 140 processes the downlink signal, for example, through filtering, amplification and frequency downconversion and converts the processed downlink signal to digital samples. The symbol demodulator 145 demodulates received pilot symbols and outputs the demodulated pilot symbols to the processor 155 for use in channel estimation.

The symbol demodulator 145 receives a frequency response estimate of the downlink from the processor 155 and acquires data symbol estimates (i.e. estimates of the transmitted data symbols) by demodulating the received data symbols using the frequency response estimate. The Rx data processor 150 demodulates the data symbol estimates (i.e. performs symbol demapping), deinterleaves the demodulated data symbols, and decodes the deinterleaved data symbols, thereby recovering the traffic data transmitted by the BS 105.

The operations of the symbol demodulator 145 and the Rx data processor 150 are complementary to the operations of the symbol modulator 120 and the Tx data processor 115 of the BS 105.

On the uplink, in the UE 110, the Tx data processor 165 outputs data symbols by processing received traffic data. The symbol modulator 170 multiplexes the data symbols received from the Tx data processor 165 with pilot symbols, modulates the multiplexed symbols, and outputs a stream of the symbols to the transmitter 175. The transmitter 175 generates an uplink signal by processing the symbol stream and transmits the uplink signal to the BS 105 through the antenna 135.

The BS 105 receives the uplink signal from the UE 110 through the antenna 130. In the BS 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the UE 110.

The processors 155 and 180 control, adjust and manage operations of the UE 110 and the BS 105. The processors 155 and 180 may be connected respectively to the memories 160 and 185 that store program code and data. The memories 160 and 185 store an operating system, applications, and general files, in connection with the processors 155 and 180.

The processors 155 and 180 may also be called controllers, microcontrollers, microprocessors, or microcomputers. When a codebook is generated in hardware according to an exemplary embodiment of the present invention, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) which are adapted to implement the present invention may be included in the processors 155 and 180.

On the other hand, if a codebook is generated in firmware or software according to an exemplary embodiment of the present invention, the firmware or software may be configured to include a module, a procedure, a function, etc. which performs functions or operations according to the present invention. The firmware or software may be included in the processors 155 and 180, or stored in the memories 160 and 185 and invoked from the memories 160 and 185 by the processors 155 and 180.

The layers of radio interface protocols between a UE/BS and a network may be classified into Layers 1, 2 and 3 (L1, L2 and L3) based on the three lowest layers of the Open System Interconnection (OSI) model. A physical layer corresponds to L1 and provides an information transmission service on physical channels. A Radio Resource Control (RRC) layer corresponds to L3 and provides radio control resources between the UE and the network. The UE/BS and the network exchange RRC messages through the RRC layer.

The term "BS", as used herein, is interchangeable with "cell" or "sector", if it is used in a geographical sense. A serving BS (cell) provides conventional main services to UEs and transmits and receives control information to and from coordinated multiple transmission points. In this context, the serving BS (cell) may be referred to as an anchor BS (cell). Similarly, a neighbor BS may be referred to as a neighbor cell (or neighboring cell), when it is used in a geographical sense.

Figure 3:
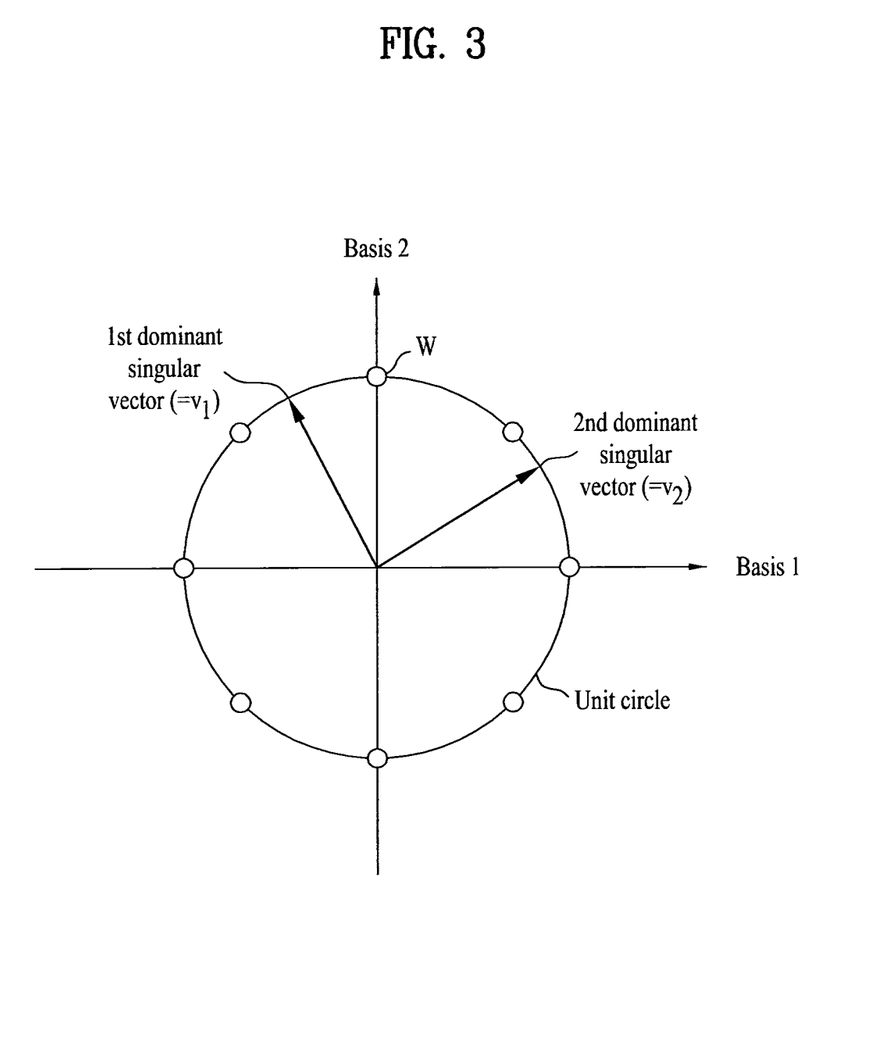
FIG. 3 illustrates an exemplary method for generating a codebook.

FIG. 3 illustrates an exemplary method for generating a codebook.

Referring to FIG. 3, on the assumption that the number of antennas ($N_t$) is 2, for the sake of convenience, singular vectors and codewords w are defined in a two-dimensional space.

The codewords W may be distributed uniformly in the two-dimensional space irrespective of dominant singular vectors, as illustrated in FIG. 3. According to a policy to maximize the minimum distance between two codewords in a Grassmannian space having channels, a codebook may be generated in such a manner that codewords are distributed uniformly in the two-dimensional space, as illustrated in FIG. 3.

A codebook performs well for uncorrelated channels, while performing poorly for correlated channels. Moreover, since the correlation between a singular vector of instantaneous channels H and a singular vector of a spatial covariance matrix R is high in correlated channels, adaptively transforming the codebook according to the spatial covariance matrix R based on the relationship is effective.

Given a single Tx stream, for example, a codeword W is an $N_t \times 1$ vector. A final transformed codebook may be expressed as the following equation.

$$W' = \sum_{i=1}^{Nt} \sigma_i v_i (v_i^H W)$$ [Equation 3]

That is, the final transformed codebook W' is determined as a weighted linear combination of singular vectors. Herein, the weighted factor of a singular value $V_i$ may be determined as the product of a singular value $\sigma_i$ and the correlations $V_i^H W$ between the singular value $V_i$ and the codeword W. Herein, the singular value $V_i$ is a direction vector of channel and the singular value $\sigma_i$ is channel strength.

Figure 4:
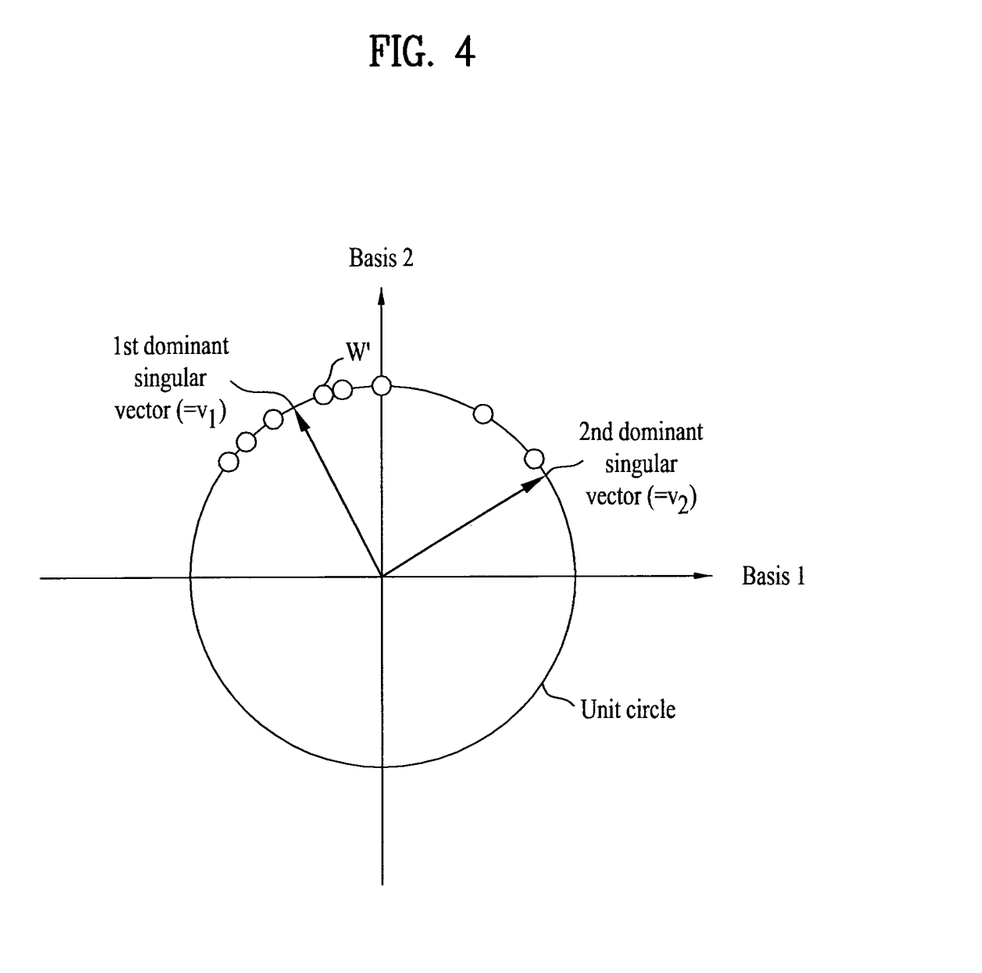
FIG. 4 illustrates another exemplary method for generating a codebook.

FIG. 4 illustrates another exemplary codebook generation method described by [Equation 3].

Referring to FIG. 4, on the assumption of two antennas ($N_t$=2) as in FIG. 3, singular vectors and codewords w' are defined in a two-dimensional space.

As described before with reference to [Equation 3], the codewords W' are densely populated around a dominant singular vector having a large $\sigma_i$ value. That is, the codewords W' are densely gathered around a first dominant singular vector having a large $\sigma_i$ value in FIG. 4. Since the codewords W' are densely populated around the dominant singular vector, a codebook having the codewords W' can be more effectively quantized.

FIG. 4 illustrates the transformed codebook in which new codewords are densely distributed around a first dominant singular vector of the long-term covariance matrix R of the channel matrix H by weighting the first dominant singular vector with a higher weighting factor.

More preferably, a minimum distance is maintained between codewords, while the codewords are densely populated around a dominant singular vector in order to generate a codebook exhibiting good performance.

However, the method for generating a codebook using the long-term covariance matrix R of the channel matrix H, illustrated in FIG. 3 faces the problem of inefficiency because codewords are uniformly distributed. Meanwhile, the dense distribution of the codewords W' around the first dominant singular vector $V_1$ of the spatial covariance matrix R leads to effective quantization of the first dominant singular vector $V_1$ but does not ensure the minimum distance between the codewords W'. That is, as a codebook is generated in such a manner that codewords are positioned around a dominant singular vector, some codewords W' are very near to one another, thereby serving as a single codeword. In an extreme case, the codewords W may be mapped to the codewords W' not in a one-to-one correspondence but in an N-to-one correspondence. For example, if some of the codewords W are orthogonal to a singular vector, these codewords are all mapped to zeroes.

Now a description will be given of methods for generating a codebook achieving better performance than codebooks generated in the codebook generation methods illustrated in FIGS. 3 and 4. A new method for transforming a codebook using a region R and a new codebook obtained by transformation according to this codebook transformation method are provided according to the present invention.

For example, given one Tx stream, codewords are generated by appropriately sampling a region R satisfying [Equation 4] for a codebook of the present invention.

$$R = \{ | \; \|r - v_1\| \leq \epsilon, \|r\| = 1 \}$$ [Equation 4]

where $V_1$ denotes a first dominant singular vector in the region R, r denotes a unit norm vector having a Euclidean distance of or less from the $V_1$, and R denotes a region including unit norm vectors r. The Euclidean distance is an ordinary distance between two points. A Euclidean space can be defined using the Euclidean distance. A norm corresponding to the Euclidean distance is called a Euclidean norm.

How to sample codewords according to the region R and the Euclidean distance $\epsilon$ that satisfy [Equation 4] may be determined by the distribution of codewords around the first dominant singular vector $V_1$ of the instantaneous channels H during a feedback period of R corresponding to the long-term feedback.

Figure 5:
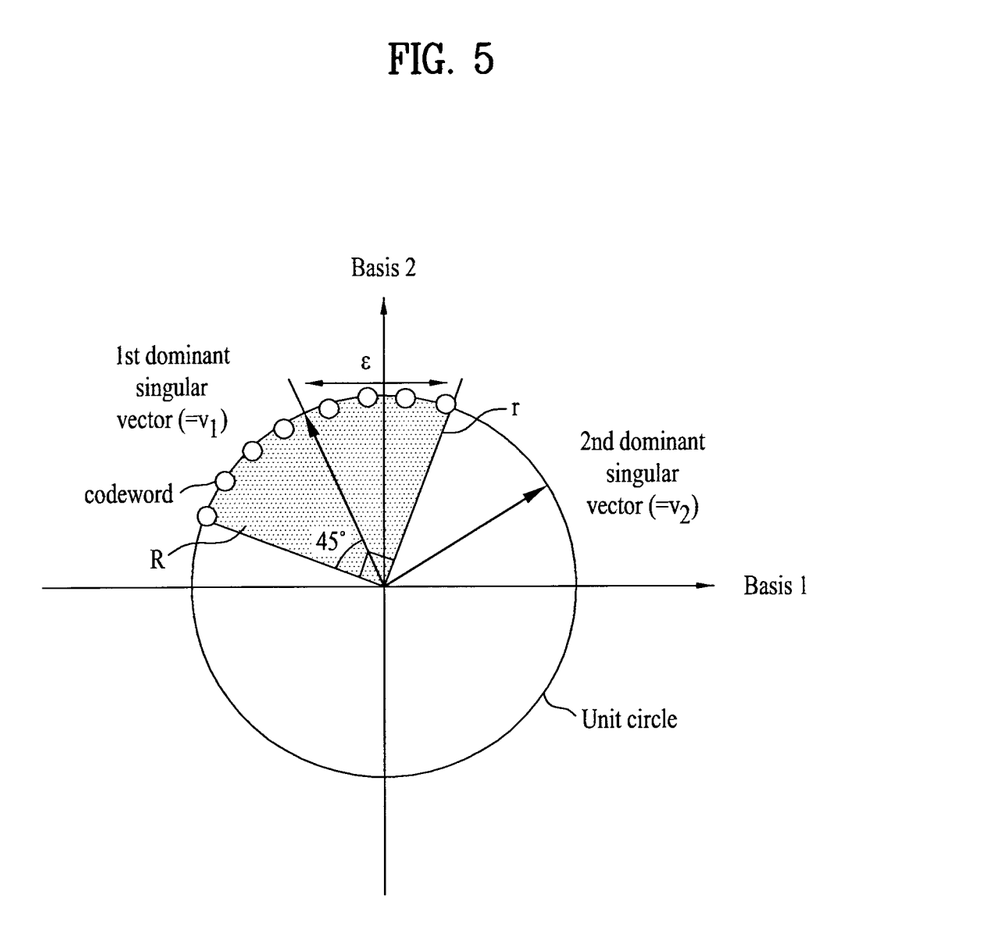
FIG. 5 illustrates a further exemplary method for generating a codebook.

FIG. 5 illustrates an exemplary method for generating a codebook according to the present invention.

For example, if variances of codewords from the first dominant singular vector $V_1$ are small (i.e, most of codewords is distributed around dominant singular vector $V_1$), the Euclidean distance $\epsilon$ is preferably designed to be small. If codewords become more frequent as the Euclidean distances between the codewords and the first dominant singular vector $V_1$ become smaller, dense sampling of the codewords may be effective. Or as a simply way, a codebook may be generated through uniform sampling in the region R as illustrated in FIG. 5.

It is assumed herein that both the transmitter side and the receiver side know the Euclidean distance $\epsilon$ and use the same sampling scheme. However, the Euclidean distance $\epsilon$ may vary with channel changes. It is preferred that if channel variation is not great, the Euclidean distance $\epsilon$ is set to a large value and if the channel variation is great, the Euclidean distance $\epsilon$ is set to a small value. Hence, in the case where the Euclidean distance $\epsilon$ varies with channel changes, the transmitter side and the receiver side need to have knowledge of the changed $\epsilon$ value. The UE may transmit information about the first dominant singular vector $V_1$ and a determined $\epsilon$ value to the BS.

Embodiment 1 of Codebook Generation Method

In accordance with this exemplary embodiment of the present invention, the region R described by [Equation 4] is appropriately sampled by multiplying a rotation matrix expressed as a diagonal matrix by a dominant singular vector of channels as shown in equation 5.

It is assumed that there are four Tx antennas (i.e. $N_t$=4), by way of example. However, the following description can be extended to a case where $N_t$=2, a case where $N_t$=8, etc. For rank=1, a transformed codebook may be given as equation 5 below $$W'' = \left\{ c \mid c = \begin{bmatrix} 1 & 0 & 0 & 0 \\ 0 & e^{j\theta_1} & 0 & 0 \\ 0 & 0 & e^{j\theta_2} & 0 \\ 0 & 0 & 0 & e^{j\theta_3} \end{bmatrix} [v_1], \theta_i \in Rot \right\}$$ [Equation 5]

where W'' denotes a new codebook obtained by appropriately sampling the region R, and Rot denotes a phase set for phase rotation. The phase set may be given as [Equation 6] or may be a combination of phase sets described in [Equation 6].

$$Rot = \left\{0, \pm \frac{\pi}{8}\right\} \text{ or } \left\{0, \pm \frac{\pi}{16}\right\} \text{ or } \left\{0, \pm \frac{\pi}{32}\right\} \text{ or } \left\{0, \pm \frac{\pi}{n}\right\},$$ [Equation 6]

where n is a real number

The phase rotation Rot may be selected based on the Euclidean distance $\epsilon$ that may be changed according to variation of the channel state. For example, as the Euclidean distance $\epsilon$ increases, the phase rotation Rot may be set to a phase having a large n value in [Equation 6].

In [Equation 5], the diagonal matrix has short-term or subband characteristics of channels. The matrix $V_1$ multiplied after the diagonal matrix has long-term or wideband characteristics.

The UE first quantizes a long-term or wideband channel using the matrix $V_1$ multiplied after the diagonal matrix and then represents a rotated short-term or subband channel using the diagonal matrix based on the quantized long-term or wideband channel. The UE may feed back the diagonal matrix and the matrix $V_1$ as Channel State Information (CSI) to the BS. The diagonal matrix and the matrix $V_1$ may be appropriately quantized through a codebook, prior to feedback. Upon receipt of the diagonal matrix and the matrix $V_1$, the BS may acquire channel information by computing [Equation 5], like the UE.

To be more specific, the BS first quantizes the long-term or wideband channel using the matrix $V_1$ and then represents the short-term or subband channel using the diagonal matrix based on the quantized long-term or wideband channel.

While [Equation 5] describes generation of a codebook for rank 1, to which the present invention is not limited, it may be extended to generation of a codebook for rank n (n is an integer larger than 1). For rank n, an extended transformed codebook may be expressed as $$W'' = \left\{ c \mid c = \begin{bmatrix} 1 & 0 & 0 & 0 \\ 0 & e^{j\theta_1} & 0 & 0 \\ 0 & 0 & e^{j\theta_2} & 0 \\ 0 & 0 & 0 & e^{j\theta_3} \end{bmatrix} [v_1 \; v_2 \; \ldots \; v_n], \theta_i \in Rot \right\}$$

[Equation 7]

Embodiment 2 of Codebook Generation Method

Compared to Embodiment 1, a codebook is generated through unitary transform in this exemplary embodiment of the present invention.

First, $W_{temp}$ are generated using the random non-zero vector X in the same procedure as described in [Equation 4]. In other words, $V_1$ in [Equation 4] and [Equation 5] is substituted by X. The random non-zero vector X may be shared between MS and BS. Codewords of the generated codebook by this manner is distributed around X in a vector space. Then an $N_t \times N_t$ unitary matrix U that rotates the random vector X in the direction of the first dominant singular vector of long-term channel is calculated. New codewords $UW_{temp}$ are generated by multiplying the unitary matrix U by the codewords $W_{temp}$.

In this unitary transform-based codebook generation method, the codewords $W_{temp}$ are generated as base codewords and X located in the geometrical center of $W_{temp}$ can be rotated in the direction of the first dominant singular vector of long-term channel so that the codewords may be concentrated around the first dominant singular vector. According to the property of unitary transform, the distance between the codewords $W_{temp}$ is kept unchanged even after the transform.

In this exemplary embodiment of the present invention, a final codebook may be created by multiplying a first codebook $W_1$ by a second codebook $W_2$.

The first codebook $W_1$ is the $N_t \times N_t$ unitary matrix U that rotates the random non-zero vector X set to the first dominant singular vector of long-term channel.

That is, the purpose of the unitary matrix U is to rotate the random vector X corresponding to the center of the region R toward the dominant singular vector of channels. Preferably, the first codebook $W_1$ is designed to be able to rotate the random vector X in all possible directions on a dominant Grassmannian space since, in this case, the first dominant singular vector may indicate random direction regardless of the random non-zero vector X.

The second codebook $W_2$ is codewords $W_{temp}$. The codewords $W_{temp}$ may be generated based on a criterion for maximizing the minimum distance between sample values in the region R. N second codebooks $W_2^0, W_2^1, \ldots, W_2^N$ may be created according to N appropriately quantized $\epsilon$ values by [Equation 4].

Thus, a final codebook may be generated using the first and second codebooks by [Equation 8].

$$W'_{prop} = W_1(i) W_2^k(j)$$

[Equation 8]

where i, j and k denote respectively the index of a codeword in the first codebook, the index of a codeword in a second codebook, and the index of the second codebook. k, which represents the indexes of second codebooks, is created using k $\epsilon$ values.

The UE may compare the codebook $W'_{prop}$ generated by [Equation 8] with channels and transmit information about i, j and k that represent the channels best to the BS. Then the BS may recover the codebook $W'_{prop}$ using the received i, j and k information because the BS shares the codebook described by [Equation 8].

Embodiment 3 of Codebook Generation Method

A final codebook may be generated in the form of the sum of the first and second codebooks $W_1$ and $W_2$ by modifying Embodiment 2. First, the first codebook $W_1$ may be generated by uniformly sampling the Grassmannian space of channel and its codewords represent dominant singular vector of channel. The first codebook $W_1$ is for quantizating dominant singular vector of channel. Since direction of dominant singular vector may be randomly, preferably, $W_1$ is uniformly distributed in the Grassmannian space of the channel. The second codebook $W_2$ may be generated by substituting the dominant singular vector $V_1$ in the [Equation 4] and [Equation 5] as a random non-zero vector a, sampling the region R appropriately, and subtracting the random non-zero vector a from the sample values. The sample values of the region R may be acquired according to a criterion that maximizes the minimum distance between samples. The center of the samples can be moved to 0 in parallel by subtracting the center point a of the region R from the samples.

In addition, N second codebooks $W_2^0, W_2^1, \ldots, W_2^N$ may be created using N appropriately quantized $\Sigma$ values by [Equation 4] in the afore-described manner. A final codebook may be generated using the first and second codebooks by [Equation 9]

$$W'_{prop} = W_1(i) + W_2^k(j)$$

[Equation 9]

where i, j and k respectively denote the index of a codeword in the first codebook, the index of a codeword in a second codebook, and the index of the second codebook.

The UE may compare the codebook $W'_{prop}$ with channels and transmit information about i, j and k that represent the channels best to the BS. Then the BS can recover the codebook $W'_{prop}$ using the received i, j and k information. k second codebooks may be generated according to ϵ values. For example, if a second codebook is generated using an ϵ value of 1 (i.e, ϵ=1) and then indication for an ϵ value may be separately signaled.

Unlike [Equation 9], a final codebook may also be generated by multiplying the second codebook by an ϵ value and then adding the product to the first codebook according to [Equation 10].

$$W'_{prop}=W_1(i)+\epsilon_k W_2(j) \quad \text{[Equation 10]}$$

According to [Equation 10], feedback information that the UE transmits to the BS may include the index of a codeword in the first codebook, i, the index of a codeword in the second codebook, j, and the index k of a codebook corresponding to the ϵ value. While the second codebook is generated taking ϵ into account in [Equation 9], the second codebook is generated irrespective of ϵ in [Equation 10]. In [Equation 10], ϵ, as a scaling factor, is multiplied by the second codebook in the final codebook $W'_{prop}$.

While it is assumed that the number of Rx streams is 1 in the above description, for the sake of convenient description, a codebook can be generated in the same manner even when the number of Rx streams is n (n is an integer greater than 1). Specifically, a codebook is designed for each of first to $n^{th}$ dominant singular vectors $V_1$ to $V_n$ of the region R, for feedback. Considering practical feedback overhead, the transmitter side and the receiver side may share the quantized value $\tilde{R}$ of the spatial covariance matrix R, instead of the spatial covariance matrix R. The above-described methods can be implemented using the quantized value $\tilde{R}$ instead of the spatial covariance matrix R.

A codebook according to the present invention can be used between a UE and a BS for inter-cell coordinated communication as well as for communication through a single BS. In a multi-cell environment, inter-cell coordinated communication may be conducted by Coordinated MultiPoint (CoMP). CoMP improves the communication performance of a UE at a cell edge. CoMP schemes are classified into a coordinated MIMO technique based on data sharing, called Joint Processing (JP), and Coordinated Scheduling/Beamforming (CS/CB) seeking to reduce inter-cell interference, such as worst companion or best companion. According to the worst companion scheme, a UE reports Precoding Matrix Indexes (PMIs) causing the worst interference, namely worst-companion PMIs for cells that carry out a CoMP operation to a serving BS, so that the cells use sub-optimal PMIs except for the worst-interfering PMIs. Thus, inter-cell interference is reduced. In contrast, the best companion scheme reduces inter-cell interference by reporting PMIs causing the least interference, namely best-companion PMIs for the CoMP cells to the BS by the UE such that the CoMP cells use the best-companion PMIs. The term "CoMP" may be used to cover coordinated communication schemes between a serving BS and a neighbor BS in the multi-cell environment.

MIMO schemes are classified into SU-MIMO and MU-MIMO. In SU-MIMO, all antenna resources of a BS are allocated to a single UE, whereas in MU-MIMO, antenna resources or spatial radio resources are allocated separately to a plurality of UEs. A codebook of the present invention can be applied even when MU-MIMO is implemented.

For example, a multi-cell downlink communication environment is assumed, in which Cell A and Cell B exist and UE a is located within Cell A, being interfered greatly from Cell B. UE a may calculate the long-term covariance matrix of an interference channel by estimating the interference channel from Cell B, quantize the long-term covariance matrix of the interference channel, and feed back the quantized long-term covariance matrix to Cell A. Then Cell A may transmit the quantized value to Cell B via a backhaul link, or UE a may feed back the quantized long-term covariance matrix value directly to Cell B. Upon receipt of the quantized long-term covariance matrix value, Cell B may determine a Tx beamforming matrix to reduce interference with UE a, in the following manner.

A BS of Cell B may calculate a dominant singular vector $V_1$ by decomposing a long-term covariance matrix received from UE b within Cell B in SVD. The BS of Cell B may also calculate a dominant singular vector $V_1^{Int}$ by decomposing the long-term covariance matrix received from UE a within Cell A in SVD.

The BS of Cell B determines a dominant singular vector V' spaced from the dominant singular vector $V_1^{Int}$ by a distance equal to or larger than $k^{Int}$ and spaced from the dominant singular vector $V_1$ by a distance equal to or less than k.

The BS of Cell B may notify a UE b within Cell B of the determined dominant singular vector V' on a Physical Downlink Control CHannel (PDCCH) or by higher-layer signaling. Thus, the UE b within cell B may generate a codebook by replacing the dominant singular vector $V_1$ with the dominant singular vector v'. The codebook may be shared between the BS and the UE (or the user) in Cell B. The UE b of Cell B may then transmit information about its channel state to the BS based on the codebook.

In the case where a BS uses multi-resolution codebooks to determine feedback codebooks for UEs managed by the BS, the above-described operation may be performed so that the BS restricts a specific codebook subset in channel feedback of a UE.

The operation of the present invention will be described for a general case. In general, the BS and the UE that use multi-resolution codebooks generate feedback codebooks in the following two steps.

Step 1) Low-resolution codeword: the UE feeds back one or more dominant singular vectors based on a measured covariance matrix R to the BS. Herein an appropriate codeword c1 is selected from a low-resolution codebook S1. This feedback has a relatively long period. The BS determines the codeword c1, taking into account the states of multiple UEs within the cell and long-term channel information about the UE. In the case of CoMP scheme, the BS may take into account long-term channel from interfered UE in neighboring cell when determining codeword c1. The BS may notify the UE of the codeword c1. The codeword c1 may be a quantized value of a dominant singular vector, or a value which is set, taking into account MU-MIMO.

Step 2) High-resolution codeword: the BS and the UE generate a codebook for feeding back information about an instantaneous channel state. A high-resolution codebook S2 for use in this case is determined by a function of the feedback codeword c1 of Step 1). For example, the high-resolution codebook may be generated by replacing the dominant singular vector $V_1$ with the codeword c1 in [Equation 4]. Thus, information about the channel state can be fed back in a relatively short period using the resulting high-resolution code book S2 (c1).

In the above general situation using multi-resolution codebooks, codebook subset restriction may be achieved in the course of notifying the UE of a low-resolution codeword by the BS. The BS may notify the UE of the low-resolution codeword c1 in Step 1) and the UE may generate the high-resolution codebook S2 (c1) based on the received codeword c1 and feed back information about a channel state using the high-resolution codebook S2 (c1) in a short period. For example, the BS may select a beamforming matrix that reduces interference with a neighbor cell as the low-resolution codeword c1.

If codebook subset restriction is not implemented, basically, the UE may determine both the low-resolution codebook c1 and the high-resolution codebook c2 and feed back the low-resolution and high-resolution codebooks c1 and c2 to the BS. On the other hand, in case of codebook subset restriction, the BS may determine the low-resolution codebook c1, taking into account the states of multiple UEs within the cell and long-term channel information about the UE and transmit the low-resolution codebook c1 to the UE. Then the UE may generate a high-resolution codebook using the low-resolution codebook c1.

MODE FOR INVENTION

Various embodiments have been described in the best mode for carrying out the invention.

INDUSTRIAL APPLICABILITY

An apparatus and method for generating a codebook in a wireless communication system according to the present invention are applicable to 3GPP LTE and other systems.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that do not explicitly cite in each other in the appended claims may be presented in combination as an exemplary embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for generating a codebook in a wireless communication system, the method comprising:
determining one or more dominant singular vectors in a channel matrix of each antenna; and
generating codewords by sampling the codewords in a region that includes unit norm vectors, each norm vector having a Euclidean distance equal to or less than a predetermined Euclidean distance value t each of the dominant singular vectors,
wherein the codewords are generated through sampling of the codewords of the region by multiplying a rotation matrix being a diagonal matrix in front of each of the dominant singular vectors, and a minimum distance between the generated codewords is maximized, and
wherein the predetermined Euclidean distance value is adjusted according to a channel variation with respect to one of the dominant singular vectors.

2. The method according to claim 1, wherein a phase rotation of the rotation matrix is one of four phase sets given by [Equation A] or a combination of the four phase sets, $$Rot = \{0, \pm \frac{\pi}{8}\} \text{ or } \{0, \pm \frac{\pi}{16}\} \text{ or } \{0, \pm \frac{\pi}{32}\} \text{ or } \{0, \pm \frac{\pi}{n}\}, \quad \text{[Equation A]}$$

where n is a real number.

3. The method according to claim 2, wherein a codebook being a set of the generated codewords is expressed as [Equation B], $$W = \left\{ c \mid c = \begin{bmatrix} 1 & 0 & 0 & 0 \\ 0 & e^{j\theta_1} & 0 & 0 \\ 0 & 0 & e^{j\theta_2} & 0 \\ 0 & 0 & 0 & e^{j\theta_3} \end{bmatrix} [v_1 \; v_2 \; \ldots \; v_n], \theta_i \in Rot \right\} \quad \text{[Equation B]}$$

where n is the number of the dominant singular vectors and k is the number of transmission antennas.

4. A method for generating a codebook in a wireless communication system, the method comprising:
determining one or more dominant singular vectors of in the channel matrix of each antenna;
determining a random non-zero vector;
generating a first codebook corresponding to a unitary matrix that rotates the random non-zero vector toward the one or more dominant singular vectors of a region;
generating a second codebook whose codewords are sampled from the region that includes unit norm vectors, each unit vector having Euclidean distance to the random non-zero vector is equal to or less than a predetermined value; and
generating a final codebook using the first and second codebooks.

5. The method according to claim 4, wherein the final codebook is a product between the first codebook and the second codebook.

6. The method according to claim 5 wherein the second codebook includes a plurality of codebooks generated based on a plurality of Euclidean distances.

7. The method according to claim 6, wherein the final codebook is expressed as [Equation C], $$W = W_1(i) W_2^k(j) \quad \text{[Equation C]}$$

where W denotes the final codebook, $W_1(i)$ denotes the first codebook, $W_2^k(j)$ denotes the second codebook, i denotes an index of a codeword in the first codebook, j denotes an index of a codeword in the second codebook, and k denotes an index of each of second codebooks generated using Euclidean distances to the one or more dominant singular vectors.

8. A method for generating a codebook in a wireless communication system, the method comprising:
determining one or more dominant singular vectors in the channel matrix of each antenna;
determining a random non-zero vector;
generating a first codebook by quantizing the one or more dominant singular vectors;

generating a second codebook by sampling codewords for a region that includes unit norm vectors, each unit norm vector having a Euclidean distance to the random non-zero vector is equal to or less than a predetermined value, so that a minimum distance between the codewords is maximized, and by subtracting the random non-zero vector from the sampled codewords; and generating a final codebook using the first and second codebooks.

9. The method according to claim 8, wherein the final codebook is expressed as sum of the first codebook and the second codebook.

10. The method according to claim 9 wherein the second codebook includes a plurality of codebooks generated based on a plurality of Euclidean distances.

11. The method according to claim 10, wherein the final codebook is expressed as [Equation D], $$W = W_1(i) W_2^k(j) \quad \text{[Equation C]}$$

where W denotes the final codebook, $W_1(i)$ denotes the first codebook, $W_2^k(j)$ denotes the second codebook, i denotes an index of a codeword in the first codebook, j denotes an index of a codeword in the second codebook, and k denotes an index of each of second codebooks generated using Euclidean distances to the dominant singular vectors.

12. The method according to claim 9, wherein the final codebook is expressed as [Equation E], $$W = W_1(i) + \epsilon_k W_2^k(j) \quad \text{[Equation C]}$$

where W denotes the final codebook, $W_1(i)$ denotes the first codebook, $W_n^k(j)$ denotes the second codebook, i denotes an index of a codeword in the first codebook, j denotes an index of a codeword in the second codebook, and $\epsilon_k$ denotes Euclidean distances to the dominant singular vectors.

13. A method for generating a codebook to support multi-cell communication at a base station (BS) in a multi-cell environment, the method comprising:

determining a serving cell dominant singular vector using a covariance matrix corresponding to channel measurement information between the base station and a user equipment (UE) within the serving cell of the base station and determining a neighboring cell dominant singular vector using a covariance matrix of an interference channel between the base station and a user equipment within the neighboring cell;

determining a modified dominant singular vector spaced from the serving cell dominant singular vector by a first predetermined value or less and spaced from the neighboring cell dominant singular vector by a second predetermined value or larger; and generating codewords by sampling the codewords for a region that includes unit norm vectors each having a Euclidean distance to the modified dominant singular vector, equal to or less than a third predetermined value, wherein the codewords are generated through sampling of the codewords in the region by multiplying a rotation matrix being a diagonal matrix in front of the modified dominant singular vector, and a minimum distance between the codewords is maximized.

14. The method according to claim 13, further comprising:
transmitting a modified codebook or neighboring cell codebook generated by using the modified dominant singular vector to the user equipment served by the base station.

15. The method according to claim 13, further comprising:
receiving information about the neighboring cell dominant singular vector from the user equipment within the neighboring cell or a base station of the user equipment within the neighboring cell.

16. The method according to claim 13, wherein the serving cell, neighboring cell and modified dominant singular vectors are quantized values.

17. A method for generating a codebook at a user equipment (UE) in a multi-cell environment, the method comprising:

receiving one or more dominant singular vectors corresponding to long-term channel information from a base station (BS); and generating codewords corresponding to short-term channel information by sampling the codewords for a region that includes unit norm vectors, each norm vector having a Euclidean distance to the received dominant singular vectors, equal to or less than a predetermined Euclidean distance value, wherein the codewords are generated through sampling of the codewords in the region by multiplying a rotation matrix being a diagonal matrix in front of the dominant singular vector, and a minimum distance between the codewords is maximized, and wherein the predetermined Euclidean distance value is adjusted according to a channel variation with respect to one of the dominant singular vectors.

18. The method according to claim 17, wherein the received dominant singular vectors is determined by the base station based on a serving cell dominant singular vector of a channel between the base station and a user equipment within the serving cell and a neighboring cell dominant singular vector of a channel between a user equipment within the neighboring cell and the base station, and is spaced from the serving cell dominant singular vector by a first predetermined value or less and spaced from the neighboring cell dominant singular vector by a second predetermined value or larger.

* * * * *